US008901485B1

(12) United States Patent
Donelick et al.

(10) Patent No.: US 8,901,485 B1
(45) Date of Patent: Dec. 2, 2014

(54) METHOD OF DETERMINING THE CONCENTRATION OF AN ELEMENT IN A SOLID USING RELATIVE ABUNDANCES OF ISOTOPES FROM THE SOLID AND A REFERENCE SOLID

(71) Applicants: Raymond Allen Donelick, Viola, ID (US); Margaret Burke Donelick, Viola, ID (US)

(72) Inventors: Raymond Allen Donelick, Viola, ID (US); Margaret Burke Donelick, Viola, ID (US)

( * ) Notice: Subject to any disclaimer, the term of this patent is extended or adjusted under 35 U.S.C. 154(b) by 0 days.

(21) Appl. No.: 13/910,999

(22) Filed: Jun. 5, 2013

(51) Int. Cl.
*G01N 21/00* (2006.01)
*G01N 21/17* (2006.01)
*H01J 49/00* (2006.01)

(52) U.S. Cl.
CPC .................................. *H01J 49/0027* (2013.01)
USPC ........ 250/282; 250/281; 250/284; 250/423 P; 250/492.1; 702/40; 702/159; 700/166

(58) Field of Classification Search
USPC ................... 250/282, 281, 284, 423 P, 492.1; 702/40, 159; 700/166
See application file for complete search history.

(56) References Cited

U.S. PATENT DOCUMENTS 5,267,274 A 11/1993 Donelick
5,502,305 A * 3/1996 Kataoka ........................ 250/282
6,888,127 B2 5/2005 Jones et al.
7,846,741 B2 * 12/2010 Toriumi ........................ 436/173
8,222,038 B2 * 7/2012 Kinoshiro et al. .............. 436/73

OTHER PUBLICATIONS

Kylander_Clark R.C., Hacker, B.R., Cottle, J.M., 2013, Laser-ablation split-stream ICP petrochronology. Chemical Geology, v. 345, p. 99-112.

Chew, D.M. and Donelick, R.A., 2012, Combined apatite fission track and U-Pb dating by LA-ICP-MS and its application in apatite provenance analysis. in: Sylvester, P, Quantitative Mineralogy and Microanalysis of Sediments and Sedimentary Rocks. Mineralogical Association of Canada Short Course 42, St. John's, Newfoundland and Labrador, p. 219-247.

Black, L.P., Kamo, S.L., Allen, C.M., Davis, D.W., Aleinikoff, J.N., Valley, J.W., Mundil, R., Campbell, I.H., Korsch, R.J., Williams, I.S., and Fudulis, C. 2004. Improved 206Pb/238U microprobe geochronology by the monitoring of trace-element-related matrix effect; Shrimp, ID-TIMS, ELA-ICP-MS and oxygen isotope documentation for a series of zircon standards. Chemical Geology, 205, p. 15-140.

Donelick, R.A., O'Sullivan, P.B., and Donelick, M.B., 2010, A Discordia-Based Method of Zircon U-Pb Dating from LA-ICP-MS Analysis of Single Spots. Smart Science for Exploration and Mining, v. 1 and 2, p. 276-278.

Donelick, R.A, O'Sullivan, P.B., Ketcham, R.A., 2005. Apatite fission-track analysis. Reviews in Mineralogy and Geochemistry, Mineralogical Society of America, v. 58, p. 49-94.

Chew, D.M. Donelick, M.B., Donelick, R.A. 2012, Apatite Chlorine Concentration Measurements by LA_ICPMS in 13th International Conference on Thermochronology, Guilin, China Aug. 24-28, 2012, p. 9.

* cited by examiner

*Primary Examiner* — Nikita Wells

(57) ABSTRACT

A method of determining the concentration of an element of interest in a solid of interest based on the ratio of the measured relative abundances of two isotopes in the solid of interest, one isotope of the element of interest and the second isotope from an element represented in the chemical formula of the solid of interest, and comparing this ratio to the ratio of the measured relative abundances of the same two isotopes for a reference solid for which the concentration of the element of interest is known. A method of calculating the concentration of the element of interest in the solid of interest. A method of executing a computer software program with instructions for calculating the concentration of the element of interest in the solid of interest.

20 Claims, 5 Drawing Sheets

Figure 1.

| | | 1-3 ↓ | 1-4 ↓ | 1-5 ↓ | 1-8 ↓ | 1-6 ↓ | 1-7 ↓ | 1-9 ↓ |
|---|---|---|---|---|---|---|---|---|
| **1-1→** | MM_1 | 1 | 32933 | 31453 | 1480 | 354649 | 436 | 354213 |
| **1-1→** | MM_2 | 2 | 31943 | 31675 | 268 | 342144 | 594 | 341550 |
| **1-1→** | MM_3 | 3 | 32791 | 31759 | 1032 | 340670 | 361 | 340309 |
| **1-2→** | DR_1 | 4 | 37896 | 31159 | 6737 | 402635 | 564 | 402071 |
| **1-2→** | DR_2 | 5 | 37264 | 31588 | 5676 | 393816 | 566 | 393250 |
| **1-1→** | F5_1 | 6 | 39162 | 31566 | 7596 | 433212 | 557 | 432655 |
| **1-2→** | TI_1 | 7 | 40976 | 31389 | 9587 | 415305 | 368 | 414937 |
| **1-2→** | IF_1 | 8 | 44732 | 30678 | 14054 | 399771 | 444 | 399327 |
| **1-2→** | B3_1 | 9 | 123568 | 31162 | 92406 | 383691 | 210 | 383481 |
| **1-1→** | FC_1 | 10 | 41499 | 29870 | 11629 | 364856 | 572 | 364284 |
| **1-1→** | OL_1 | 11 | 31230 | 30802 | 428 | 425300 | 617 | 424683 |
| **1-1→** | MD_1 | 12 | 39051 | 30347 | 8704 | 433733 | 591 | 433142 |
| **1-1→** | B4_1 | 13 | 131097 | 30447 | 100650 | 422908 | 288 | 422620 |
| **1-2→** | B2_1 | 14 | 75135 | 30567 | 44568 | 367097 | 396 | 366701 |

Figure 2.

| | 2-4 ↓ | 2-3 ↓ | 2-6 ↓ | 2-5 ↓ |
|---|---|---|---|---|
| 2-1→ MM_1 | 1 | 0.004178 | | |
| 2-1→ MM_2 | 2 | 0.000785 | | |
| 2-1→ MM_3 | 3 | 0.003033 | | |
| 2-2 2-7→ DR_1 | 2-10→ 4 | 0.016756 | 0.41 | 2-8 2-9→ 24.469 |
| 2-2→ DR_2 | 2-10→ 5 | 0.014434 | 0.41 | 2-9→ 28.406 |
| 2-1→ FS_1 | 6 | 0.017557 | | |
| 2-2→ TI_1 | 2-10→ 7 | 0.023105 | 0.59 | 2-9→ 25.536 |
| 2-2→ IF_1 | 2-10→ 8 | 0.035194 | 0.82 | 2-9→ 23.299 |
| 2-2→ B3_1 | 2-10→ 9 | 0.240966 | 6.38 | 2-9→ 26.477 |
| 2-1→ FC_1 | 10 | 0.031923 | | |
| 2-1→ OL_1 | 11 | 0.001008 | | |
| 2-1→ MD_1 | 12 | 0.020095 | | |
| 2-1→ B4_1 | 13 | 0.238157 | | |
| 2-2→ B2_1 | 2-10→ 14 | 0.121538 | 2.98 | 2-9→ 24.519 |

Figure 3.

| | | | | 3-3 ↓ | 3-5 ↓ | 3-6 ↓ | 3-7 ↓ |
|---|---|---|---|---|---|---|---|
| 3-1→ | MM_1 | 3-4→ | 1 | 24.469 | 0.10 | 26.488 | 0.11 |
| 3-1→ | MM_2 | 3-4→ | 2 | 24.469 | 0.02 | 26.336 | 0.02 |
| 3-1→ | MM_3 | 3-4→ | 3 | 24.469 | 0.07 | 26.184 | 0.08 |
| 3-2→ | DR_1 | | | | | | |
| | DR_2 | | | | | | |
| 3-1→ | F5_1 | 3-4→ | 6 | 24.469 | 0.43 | 25.728 | 0.45 |
| | TI_1 | | | | | | |
| | IF_1 | | | | | | |
| | B3_1 | | | | | | |
| 3-1→ | FC_1 | 3-4→ | 10 | 24.469 | 0.78 | 25.120 | 0.80 |
| 3-1→ | OL_1 | 3-4→ | 11 | 24.469 | 0.02 | 24.968 | 0.03 |
| 3-1→ | MD_1 | 3-4→ | 12 | 24.469 | 0.49 | 24.816 | 0.50 |
| 3-1→ | B3_1 | 3-4→ | 13 | 24.469 | 5.83 | 24.664 | 5.87 |
| | B3_1 | | | | | | |

Figure 5.

| 5-2 ↓ | 5-1 ↓ | 5-5 ↓ | 5-7 ↓ | 5-6 ↓ | 5-10 ↓ | 5-12 ↓ | 5-11 ↓ | 5-16 ↓ |
|---|---|---|---|---|---|---|---|---|
| Na | 0.013683 | 0.013956 | P | 5.940507 | 5.999912 | F | | 5-14 ↓ 1.760237 |
| Mg | 0.004843 | 0.004940 | S | 0.000000 | 0.000000 | Cl | 0.239763 | 0.239763 |
| Ca | 9.726995 | 9.921535 | As | 0.000087 | 0.000088 | | | |
| Mn | 0.006140 | 0.006263 | | | | | | |
| Fe | 0.010740 | 0.010955 | | | | | | |
| Sr | 0.002870 | 0.002928 | | | | | | |
| Y | 0.006293 | 0.006418 | | | | | | |
| La | 0.003577 | 0.003649 | | | | | | |
| Ce | 0.012183 | 0.012427 | | | | | | |
| Pr | 0.001978 | 0.002018 | | | | | | |
| Nd | 0.005735 | 0.005850 | | | | | | |
| Sm | 0.001599 | 0.001631 | | | | | | |
| Eu | 0.000101 | 0.000103 | | | | | | |
| Gd | 0.002323 | 0.002370 | | | | | | |
| Tb | 0.001881 | 0.001918 | | | | | | |
| Dy | 0.001383 | 0.001411 | | | | | | |
| Ho | 0.000281 | 0.000287 | | | | | | |
| Er | 0.000638 | 0.000651 | | | | | | |
| Tm | 0.000152 | 0.000155 | | | | | | |
| Yb | 0.000303 | 0.000309 | | | | | | |
| Lu | 0.000103 | 0.000105 | | | | | | |
| Th | 0.000090 | 0.000091 | | | | | | |
| U | 0.000030 | 0.000030 | | | | | | |
| | | | | | | | | |
| | 5-4 ↓ 9.803921 | 5-3 ↓ 10.000000 | | 5-9 ↓ 5.940594 | 5-8 ↓ 6.000000 | | 5-13 ↓ 0.239763 | 5-15 ↓ 2.000000 |

METHOD OF DETERMINING THE CONCENTRATION OF AN ELEMENT IN A SOLID USING RELATIVE ABUNDANCES OF ISOTOPES FROM THE SOLID AND A REFERENCE SOLID

BACKGROUND

A mineral is commonly defined as a naturally occurring crystalline solid in the current art. In this document, the definition of a mineral is extended to also comprise a synthetic crystalline solid which would be defined as a mineral in the common sense if it had occurred naturally.

The density of a mineral is defined as the mass of a mineral divided by the total volume of the mineral. The density of apatite minerals studied by human beings lies within the range 3.16-3.22 grams per cubic centimeter. The density of most zircon minerals studied by human beings lies within the range 4.6-4.7 grams per cubic centimeter.

In chemistry, concentration is commonly defined in the current art as the abundance of a constituent divided by the total volume of the mixture containing that constituent. Alternatively, concentration may be defined as the mass of a constituent divided by the total mass of the mixture containing that constituent. For mineral species, it is common practice in the current art to express concentration in units of weight percent; weight percent is the percent of the total mass of the mixture represented by the mass of the constituent; comparing concentrations in units of weight percent of an element from mineral to mineral of the same species assumes essentially constant density among the same minerals. For mineral species, it is also common practice in the current art to express concentration in terms of parts per million; parts per million is the number of micrograms of constituent contained in one gram of mixture; comparing concentrations in units of parts per million of an element from mineral to mineral of the same species assumes essentially constant density among the same minerals. For mineral species, it is also common practice in the current art to express concentration in units of atoms per formula unit; atoms per formula unit is the number of atoms of a constituent in the chemical formula of a mixture.

In the current art, chemical elements may be represented by chemical symbols commonly listed in the periodic table of the chemical elements. Symbols for chemical elements used in this description of the preferred embodiment of the invention include: Ca for the element calcium; P for the element phosphorus; O for the element oxygen; F for the element fluorine; Cl for the element chlorine; Zr for the element zirconium; Si for the element silicon; Ar for the element argon.

The most common natural occurrences of the mineral apatite studied by human beings have chemical compositions represented by the chemical formula $Ca_{10}(PO_4)_6[F,Cl,OH]_2$, The most common natural occurrences of the mineral apatite studied by human beings also comprise a range of fluorine, chlorine, and OH combinations. These natural apatite minerals comprise a range of various detectable and minor elements including: iron, manganese, and cerium, samarium, and other rare earth elements substituting for calcium; aluminum, silicon, sulfur, and arsenic substituting for phosphorous; bromine substituting for fluorine, chlorine, and OH. Most naturally occurring apatite minerals also contain detectable amounts of lead, thorium, and uranium.

The most common natural occurrences of the mineral zircon studied by human beings have chemical compositions represented by the chemical formula $Zr_4(SiO4)_4$. These natural zircon minerals comprise a range of various detectable and minor elements including: hafnium, and cerium, samarium, and other rare earth elements substituting for zirconium; aluminum substituting for silicon. Most naturally occurring zircon minerals also contain detectable amounts of lead, thorium, and uranium.

Each atomic nucleus of an element is composed of a fixed number of protons specific to that element. As an example, each uranium atomic nucleus contains 92 protons. Each element is also composed of one or more isotopes. The atomic nucleus of each specific isotope of an element is composed of a fixed number of protons specific to that element and a fixed number of neutrons specific to that isotope of that element. An atomic nucleus of the isotope $^{235}U$ contains 92 protons and 143 neutrons; the superscript $^{235}$ preceding the chemical symbol U indicates the sum of the number of protons and neutrons for the isotope $^{235}U$. An atomic nucleus of the isotope $^{238}U$ contains 92 protons and 146 neutrons.

Isotopes of lead, thorium, and uranium in a natural apatite or zircon mineral may be used to study the natural history of the apatite or zircon mineral. Each $^{235}U$ atomic nucleus possesses an inherent probability that it will undergo spontaneous radioactive decay by emission of a $^{4}He$ nucleus. Emission of a $^{4}He$ nucleus by an atomic nucleus is a process commonly referred to as alpha-decay in the current art. Each $^{235}U$ atomic nucleus that experiences alpha-decay is transmuted to a single $^{207}Pb$ atomic nucleus and seven $^{4}He$ atomic nuclei. Each $^{238}U$ atomic nucleus possesses an intrinsic probability that it will undergo alpha-decay and be transmuted to a single $^{208}Pb$ atomic nucleus and eight $^{4}He$ atomic nuclei. Each $^{232}Th$ atomic nucleus possesses an intrinsic probability that it will undergo alpha-decay and be transmuted to a single $^{208}Pb$ atomic nucleus and six $^{4}He$ atomic nuclei. Immediately following each emission of a $^{4}He$ atomic nucleus, the $^{4}He$ atomic nucleus is repelled from its parent atomic nucleus and it leaves a zone of damaged host crystal along its path of travel. For each emission of a $^{4}He$ atomic nucleus, the resulting zone of damaged host crystal left by the $^{4}He$ atomic nucleus is commonly referred to as a latent alpha track in the current art.

Each $^{238}U$ atomic nucleus possesses an inherent probability that it will undergo spontaneous radioactive decay by nuclear fission. Nuclear fission is a process by which the atomic nucleus undergoing fission splits into two or three nuclear particles, each particle larger than a $^{4}He$ atomic nucleus. Immediately following nuclear fission, the resultant nuclear particles repel each other, the nuclear particles travel in opposing directions within their host crystal lattice, and the nuclear particles leave zones of damaged host crystal along their paths of travel. For each single nuclear fission event, the sum of the resulting zones of damaged host crystal left by the two or three nuclear particles is commonly referred to as a latent fission track in the current art.

Several methods of the current art utilize measurements of the relative abundances of one or more isotopes of lead, thorium, and uranium, and/or samarium, the relative abundance of the isotope $^{4}He$, and/or the relative abundance of latent fission tracks within a natural apatite or zircon mineral. As an example, knowledge of the relative abundances of the isotopes $^{238}U$ and $^{206}Pb$ within a natural zircon mineral may be used to calculate the time elapsed since the zircon mineral crystallized. The current art method commonly referred to as uranium-lead dating comprises this approach; uranium-lead dating may be applied to other minerals such as apatite in the current art. Accurate and precise uranium-lead dating of a natural zircon mineral may also comprise the measurement of the relative abundances of the isotopes $^{207}Pb$, $^{208}Pb$, $^{232}T$, and $^{235}U$ to enable the human being to more fully comprehend the implications of the measurements of the relative abundances of $^{206}Pb$ and $^{238}U$. As another example, knowledge of the relative abundances of the isotopes $^{147}Sm$, $^{232}Th$, $^{235}U$, $^{238}U$ and $^{4}He$ within a natural zircon mineral may be used to calculate the time elapsed since $^{4}He$ effectively ceased to diffuse out of the zircon mineral. The current art method commonly referred to as uranium-thorium-samarium-helium dating comprises this approach; uranium-thorium-samarium-helium dating may be applied to other minerals such as apatite in the current art.

Several methods of the current art utilize measurements of the concentrations of elements in minerals. As an example, consider a case in which a natural zircon mineral is derived from a rock comprised of sand deposited by a river. In this case, there may exist one or more populations of individual zircon minerals mixed together within this sand if the river that transported and deposited the sand also transported and deposited zircon minerals from one or more upstream or airborne sources. A detailed understanding by the human being of the concentrations of detectable and minor elements within each zircon mineral from the mixture of zircon minerals may enable to human being to group the zircon minerals into their respective populations.

Following the nuclear fission of a $^{238}U$ atomic nucleus in apatite, the damaged host crystal lattice that comprises the resultant latent fission track begins to spontaneously and irreversibly convert back to undamaged host crystal lattice by a process referred to annealing in the current art. A latent fission track in apatite may be preferentially dissolved using an appropriate chemical mixture and studied by a human being. The study of chemically dissolved latent fission tracks in apatite is commonly referred to fission track analysis of apatite in the current art. Based on studies of apatite minerals chosen by human beings to represent the most common natural occurrences of the mineral apatite, the current art comprises knowledge of the rate of conversion of the damaged host crystal lattice comprising a latent fission track back to undamaged host crystal lattice including: the rate increasing with increasing temperature; the rate increasing with increasing fluorine concentration in the host apatite mineral; the rate decreasing with increasing chlorine concentration in the host apatite mineral; the rate likely decreasing with increasing iron concentration in the host apatite mineral; the rate likely decreasing with increasing manganese concentration in the host apatite mineral; the rate likely decreasing with increasing cerium and other rare earth element concentrations in the host apatite mineral. A detailed understanding by the human being of the concentrations of detectable and minor elements within each apatite mineral from which measurements pertaining to dissolved latent fission tracks are derived may enable to human being to better interpret the measurements pertaining to the dissolved latent fission tracks.

One common method in the current art of determining the concentration of an element in a mineral of interest is commonly referred to as electron probe microanalysis. Electron probe microanalysis of the concentration of a specific element in a mineral of interest comprises: focusing a beam of electrons onto a surface of the mineral of interest; detecting x-ray radiation that results from the interaction of the electrons with atoms in the mineral of interest; seeking and counting x-rays of a specific energy that are diagnostic of the specific element; comparing the count of x-rays of this specific energy from the mineral of interest to the count of x-rays of the same specific energy generated from a reference material containing the specific element at a known concentration; converting the x-ray count for the specific element from the mineral of interest to the concentration of the specific element in the mineral of interest. Comparing x-ray counts between the mineral of interest and the reference mineral requires the generation of the x-rays under a constant set of operating conditions comprising: essentially equal electron beam current and potential; essentially equal environment at the surface where the electron beam intersects the mineral of interest and the reference mineral. The reference material used in electron probe microanalysis in the current art may be of the same mineral species as the mineral of interest or it may be a mineral of a different species or a material that is not a mineral such as a synthetic glass.

A second common method in the current art of determining the concentration of an element in a mineral of interest is commonly referred to as laser ablation-mass spectrometry. Laser ablation-mass spectrometry measurement of the concentration of a specific element in a mineral of interest comprises: focusing a beam of photons onto a surface of the mineral of interest causing the mineral of interest to be fragmented; transporting fragments of the mineral of interest into a mass spectrometer; seeking and counting an isotope that is diagnostic of the specific element; comparing the count of the isotope specific to the element from the mineral of interest to the count of the same isotope generated from a reference material containing the specific element at a known concentration; converting the isotope count for the specific element from the mineral of interest to the concentration of the specific element in the mineral of interest. Comparing isotope counts between the mineral of interest and the reference mineral requires the generation of fragment of the mineral of interest fragments and fragments of the reference mineral under a constant set of operating conditions comprising: essentially equal photon beam frequency and intensity; essentially equal fragment generation rate resulting from the interaction with the photon beam; essentially equal transport rate of the fragments to the mass spectrometer. The reference material used in laser ablation-mass spectrometry in the current art may be of the same mineral species as the mineral of interest or it may be a mineral of a different species or a material that is not a mineral such as a synthetic glass.

A case may be encountered in the current art of laser ablation-mass spectrometry wherein the rate of generation of fragments of the mineral of interest differs from the rate of generation of fragments of the reference mineral when all attempts are made by a human being to avoid this difference. One such case exists when photons fragment the surface of a zircon mineral containing latent alpha tracks and isotope counts from these fragments are compared to isotope counts from a reference mineral that lacks latent alpha tracks. The latent alpha tracks in the zircon mineral of interest render the crystal lattice of the zircon mineral of interest softer than its pristine counterpart and thereby enhance the rate of fragmentation by the photons relative to the rate of fragmentation by the photons of its pristine counterpart. The rate of fragmentation by photons among zircon minerals may commonly vary because the number of latent alpha tracks among zircon minerals commonly varies. A second such case exists when photons fragment the surface of an apatite mineral of interest containing dissolved latent fission tracks and isotope counts from these fragments are compared to isotope counts from fragments of a reference mineral that lacks dissolved latent fission tracks. The dissolved latent fission tracks in the apatite mineral of interest enhance the rate of fragmentation by the photons relative to the rate of fragmentation by photons of an apatite mineral containing zero dissolved latent fission tracks. The rate of fragmentation by photons among apatite minerals may commonly vary because the number of dissolved latent fission tracks per unit volume of fragmented apatite mineral among apatite minerals commonly varies. A third such case exists when the rate of transport to the mass spectrometer of fragments of the mineral of interest or fragments of the reference mineral depends on the position of the mineral of interest or reference mineral within the fragmentation apparatus. It is common in the current art for transport rate to vary from within the fragmentation apparatus due to variable flow of the transport gases within the fragmentation apparatus comprising the current art. These three cases may exist alone or in some combination together.

BRIEF SUMMARY

This invention includes a method of determining the concentration of an element of interest in a solid of interest comprising: obtaining a measurement of the relative abundance of an isotope of the element of interest in the solid of interest; obtaining a measurement of the relative abundance of an isotope of a second element in the solid of interest, the second element being an element represented in the chemical formula of the solid of interest; calculating the ratio of the measurement of the relative abundance of the isotope of the element of interest in the solid of interest to the measurement of the relative abundance of the isotope of the second element in the solid of interest; obtaining a measurement of the relative abundance of the same isotope of the element of interest in a reference solid possessing the same nominal crystal structure as the solid of interest; obtaining a measurement of the relative abundance of the same isotope of the same second element in the reference solid; calculating the ratio of the measurement of the relative abundance of the same isotope of the element of interest in reference solid to the measurement of the relative abundance of the same isotope of the second element in reference solid. The invention includes: comparing the ratios of the two isotopes between the solid of interest and the reference solid. The invention includes calculating the concentration of the element of interest in the solid of interest based on the comparison of the ratios of the two isotopes between the solid of interest and the reference solid and the known concentration of the element of interest in the reference solid. The invention includes the executing of a computer software program with instructions for calculating the concentration of the element of interest in the solid of interest.

This invention is applicable to laser ablation-mass spectrometry and other current art methods that include: the fragmentation of a solid by a focused laser beam or the fragmentation of the solid by other means such as a particle beam; the transport of the fragments of the solid into a mass spectrometer; the analysis of the isotopic composition of the fragments of the solid by the mass spectrometer. The invention allows the human being to determine the concentration of an element of interest in the solid of interest in cases in which one or more of the following conditions is true: the fragmentation rate of the solid depends on the concentration of latent alpha tracks in the solid of interest; the fragmentation rate of the solid depends on the number of dissolved latent fission tracks in the solid of interest; the transport rate of the fragments of the solid into the mass spectrometer depends on the position of the solid of interest in the fragmentation apparatus.

This invention is applicable to the current art methods of: uranium-lead dating of a mineral of interest; uranium-thorium-samarium-helium dating of a mineral of interest; fission track analysis of a mineral of interest; methods in which fragmentation rate of the solid of interest by the fragmentation apparatus may vary from solid to solid of the same nominal crystal structure.

BRIEF DESCRIPTION OF DRAWINGS

FIG. 1. Isotope count values, background count values, and signal values for apatite minerals of interest and reference apatite minerals.

FIG. 2. Reference apatite mineral chlorine concentration/($^{35}Cl/^{43}Ca$) ratio.

FIG. 3. Chlorine concentrations of apatite minerals of interest.

FIG. 5. Element concentrations of an apatite mineral of interest normalized to stoichiometric amount.

DETAILED DESCRIPTION OF THE INVENTION

Preferred Embodiment of the Invention

Figure 4:
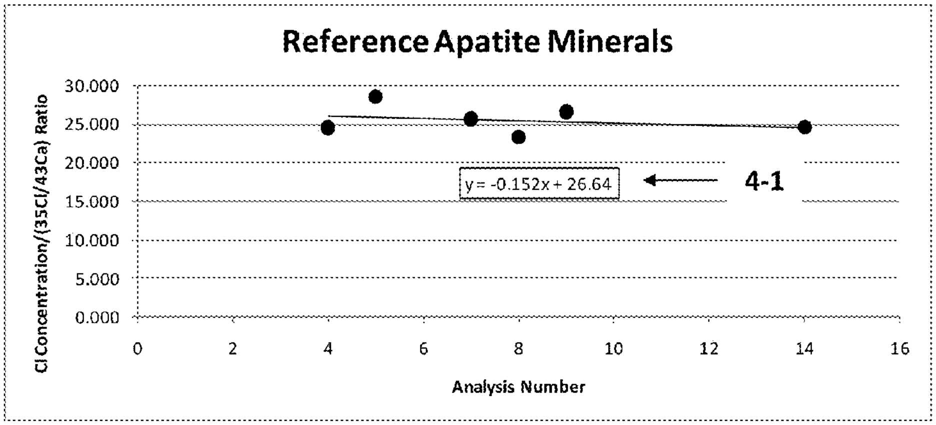
FIG. 4. Mathematical formula of the dependence of reference apatite mineral chlorine conentration/($^{35}Cl/^{43}Ca$) ratio on analysis number.

In the current art, it is common to express the chemical composition of an element in a mineral in units of weight percent of the oxide equivalent of an element. As an example, the chemical concentration of the element calcium in apatite is commonly expressed in units of the percent of the mineral mass that may be represented by the chemical formula CaO. As another example, the chemical concentration of the element chlorine in apatite is commonly expressed in units of the percent of the mineral mass that may be represented by the chemical formula Cl; chlorine does not normally form oxide compounds. The preferred embodiment of the invention expresses the chemical composition of an element in a mineral in units of weight percent; other units of chemical composition commonly used in the current art may be used in this invention including: parts per million; atoms per formula unit.

In the preferred embodiment of the invention, the laser ablation-mass spectrometry instruments used are a Resonetics M-50 193 nm ArF Eximer laser ablation system in line with an Agilent 7700x quadrupole, inductively coupled plasma, mass spectrometer; other ablation systems and mass spectrometers may be used. Laser ablation is performed using a 26 μm spot, 8 Hz laser repetition rate, with the laser set in constant energy mode; upon arrival at a spot, data collection by the mass spectrometer is triggered, a 7.6 s delay is followed by 40 s of ablation, followed by a 28 s delay before the laser is positioned at the next spot and the sequence repeated. Other settings for laser ablation spot size, repetition rate, laser mode, delay times, and ablation time are possible. Ablated material is transported to the mass spectrometer using ultra high purity helium spiked with ultra high purity nitrogen with an inline mercury trap; high purity argon with an inline mercury trap is the plasma gas. Other combinations of transport, spike, and plasma gases are possible, with or without inline mercury traps.

In the current art, it is common practice to monitor the count value that the mass spectrometer produces for an isotope of interest for the case when only transport, spike, and plasma gases are transported to the mass spectrometer; no fragments of the mineral of interest or fragments of the reference mineral are transported to the mass spectrometer in this case. In the current art, a count value for an isotope of interest for this case is commonly referred to as the background count value for the isotope of interest. In the current art, this background count value is subtracted from the count value obtained from the mass spectrometer for the case when fragments of the mineral of interest are transported to the mass spectrometer or fragments of the reference mineral are transported to the mass spectrometer; the difference is commonly referred to as the signal value for the isotope of interest.

The preferred embodiment of the invention includes the measuring of count values and background count values for isotopes specific to elements comprising: all detectable elements in the chemical formula of the mineral of interest and a reference mineral of the same species, other elements of interest to the human being studying the mineral of interest that may be part of the mixture of elements forming the mineral of interest and the reference mineral of the same species, all possible rare earth elements; lead, thorium, and uranium. The following isotopes are measured for apatite minerals of interest and apatite reference minerals: $^{23}$Na, $^{24}$Mg, $^{27}$Al, $^{29}$Si, $^{31}$P, $^{34}$S, $^{35}$Cl, $^{43}$Ca, $^{48}$Ca, $^{55}$Mn, $^{56}$Fe, $^{75}$As, $^{79}$Br, $^{88}$Sr, $^{89}$Y, $^{139}$La, $^{140}$Ce, $^{141}$Pr, $^{146}$Nd, $^{147}$Sm, $^{151}$Eu, $^{157}$Gd, $^{159}$Tb, $^{163}$Dy, $^{165}$Ho, $^{166}$Er, $^{169}$Tm, $^{172}$Yb, $^{175}$Lu, $^{202}$Hg, $^{204}$Pb, $^{206}$Pb, $^{207}$Pb, $^{208}$Pb, $^{232}$Th, $^{235}$U, $^{238}$U. The human being may choose to add isotopes to this listing. The human being may choose to remove isotopes from this listing. The following isotopes are measured for zircon minerals of interest and zircon reference minerals: $^{24}$Mg, $^{27}$Al, $^{28}$Si, $^{29}$Si, $^{31}$P, $^{34}$S, $^{43}$Ca, $^{47}$Ti, $^{56}$Fe, $^{89}$Y, $^{90}$Zr, $^{139}$La, $^{140}$Ce, $^{141}$Pr, $^{146}$Nd, $^{147}$Sm, $^{151}$Eu, $^{157}$Gd, $^{159}$Tb, $^{163}$Dy, $^{165}$Ho, $^{166}$Er, $^{169}$Tm, $^{172}$Yb, $^{175}$Lu, $^{202}$Hg, $^{204}$Pb, $^{206}$Pb, $^{207}$Pb, $^{208}$Pb, $^{232}$Th, $^{235}$U, $^{238}$U. The human being may choose to add isotopes to this listing. The human being may choose to remove isotopes from this listing.

In the preferred embodiment of the invention, apatite minerals of interest 1-1 and reference apatite minerals 1-2 are analyzed sequentially and each individual analysis may be assigned an analysis number 1-3. Two isotopes are counted by the mass spectrometer during each analysis represented by an analysis number 1-3 to determine the concentration of an element of interest in a mineral of interest: an isotope of the element of interest; an isotope of one of the elements from the group of elements that comprise the chemical formula of the mineral of interest. As an example of the invention, determining the concentration of chlorine in an apatite mineral of interest includes acquiring from the mass spectrometer: the count value for $^{35}$Cl-4; the background count value for $^{35}$Cl 1-5; the count value for $^{43}$Ca 1-6; the background count value for $^{43}$Ca 1-7. The signal value for $^{35}$Cl 1-8 is set equal to the count value for $^{35}$Cl 1-4 minus the background count value for $^{35}$Cl 1-5. The signal value for $^{43}$Ca 1-9 is set equal to the count value for $^{43}$Ca 1-6 minus the background count value for $^{43}$Ca 1-7. In the current art and in the preferred embodiment of the invention, the background count values for $^{35}$Cl 1-5 may be smoothed as a function of analysis number 1-3. In the current art and in the preferred embodiment of the invention, the background count values for $^{43}$Ca 1-7 may be smoothed as a function of analysis number 1-3.

In the preferred embodiment of the invention and in reference to the preceding paragraph concerning apatite minerals of interest: another isotope of chlorine other than $^{35}$Cl may be counted by the mass spectrometer; another isotope of calcium other than $^{43}$Ca may be counted by the mass spectrometer; an element other than calcium from the group of elements that comprise the chemical formula of the mineral of interest may be chosen by the human being. In the preferred embodiment of the invention, another mineral species may be chosen by the human being. As an example, to determine the concentration of dysprosium in a zircon mineral of interest, the preferred embodiment of the invention includes acquiring from the mass spectrometer: the count value for $^{163}$Dy; the background count value for $^{163}$Dy; the count value for $^{91}$Zr; the background count value for $^{91}$Zr. The signal value for $^{163}$Dy is set equal to the count value for $^{163}$Dy minus the background count value for $^{163}$Dy. The signal value for $^{91}$Zr is calculated from the difference of the count value for $^{91}$Zr minus the background count value for $^{91}$Zr.

In the preferred embodiment of the invention, the chlorine concentration of an apatite mineral of interest 2-1 may be calculated using steps including: for the apatite mineral of interest 2-1 and for the reference minerals 2-2, calculating the $^{35}$Cl/$^{43}$Ca signal value ratio 2-3 for each individual analysis represented by an analysis number 2-4 by setting it equal to the $^{35}$Cl signal value 1-8 divided by the $^{43}$Ca signal value 1-9 for that analysis number; for each reference mineral 2-2, calculating the reference chlorine concentration/($^{35}$Cl/$^{43}$Ca) ratio 2-5 for each reference mineral analysis represented by an analysis number 2-4 by setting it equal to the reference chlorine concentration 2-6 divided by the reference $^{35}$Cl/$^{43}$Ca signal value ratio 2-3 for that analysis number.

In the preferred embodiment of the invention, the chlorine concentration of an apatite mineral of interest 3-1 may be calculated using steps including: the human being selecting a preferred reference apatite mineral, as an example DR_1 2-7 3-2, and its chlorine concentration/($^{35}$Cl/$^{43}$Ca) ratio, for example DR_1 2-8, and applying this chlorine concentration/($^{35}$Cl/$^{43}$Ca) ratio 2-8 3-3 to the analysis number 3-4 of the apatite mineral of interest 3-1; calculating the chlorine concentration 3-5 of the apatite mineral of interest 3-1 represented by an analysis number 3-4 by setting it equal to the chlorine concentration/($^{35}$Cl/$^{43}$Ca) ratio 3-3 for the reference apatite mineral preferred by the human being 2-7 3-2 multiplied by the $^{35}$Cl/$^{43}$Ca signal value ratio 2-3 for that analysis number 3-4.

In the preferred embodiment of the invention, the chlorine concentration of an apatite mineral of interest 3-1 may be calculated using steps including: the human being selecting a series of reference apatite mineral chlorine concentration/($^{35}$Cl/$^{43}$Ca) ratios 2-9 and calculating a mathematical equation 4-1 that describes the dependence of reference apatite mineral chlorine concentration/($^{35}$Cl/$^{43}$Ca) ratio 2-9 on analysis number 2_10; using the mathematical equation 4-1 to calculate the reference apatite mineral chlorine concentration/($^{35}$Cl/$^{43}$Ca) ratio 3-6 for the apatite mineral of interest 3-1 represented by an analysis number 3-4; calculating the chlorine concentration 3-7 of the apatite mineral of interest 3-1 represented by an analysis number 3-4 by setting it equal to the reference apatite mineral chlorine concentration/($^{35}$Cl/$^{43}$Ca) ratio 3-6 multiplied by the $^{35}$Cl/$^{43}$Ca signal value ratio 2-3 for that analysis number 3-4.

In the preferred embodiment of the invention, the concentration of an element of interest may be normalized to the stoichiometric amount for the element in chemical formula of the mineral of interest with which the element of interest is associated. The apatite chemical formula is comprised of ten calcium atoms, six phosphorus atoms, and two fluorine+chlorine+OH atoms where OH is considered one atom. For an apatite mineral of interest, the measured concentrations 5-1 of calcium and detectable elements that substitute for calcium 5-2 are normalized to ten atoms 5-3 using steps comprised of: obtaining the sum 5-4 of the measured concentrations in units of atoms per formula unit 5-1 of calcium and detectable elements that substitute for calcium 5-2; calculating the normalized concentrations in units of atoms per formula unit 5-5 of calcium and detectable elements that substitute for calcium 5-2 by multiplying the measured concentrations in units of atoms per formula unit 5-1 by ten 5-3 and dividing the result by the sum 5-4 of the measured concentrations. For an apatite mineral of interest, the measured concentrations 5-6 of phosphorus and detectable elements that substitute for phosphorus 5-7 are normalized to six atoms 5-8 using steps comprised of: obtaining the sum 5-9 of the measured concentrations in units of atoms per formula unit 5-6 of phosphorus and detectable elements that substitute for phosphorus 5-7; calculating the normalized concentrations in units of atoms per formula unit 5-10 of phosphorus and detectable elements that substitute for phosphorus 5-7 by multiplying the measured concentrations in units of atoms per formula unit 5-6 by six 5-8 and dividing the result by the sum 5-9 of the measured concentrations.

In the preferred embodiment of the invention, fluorine, oxygen, and hydrogen are not measurable using laser ablation-mass spectrometry. For an apatite mineral of interest, the measured concentrations 5-11 of chlorine and detectable elements that substitute for chlorine 5-12 are summed 5-13. The normalized concentration of fluorine 5-14 is calculated by subtracting the sum 5-13 of the measured concentrations 5-11 of chlorine and detectable elements that substitute for chlorine 5-12 from two 5-15. The normalized concentrations 5-16 of chlorine and detectable elements that substitute for chlorine 5-12 are set equal to the measured concentrations 5-11 of chlorine and detectable elements that substitute for chlorine 5-12.

The invention claimed is:

1. A method of determining the concentration of an element of interest in a solid of interest comprising the steps of: obtaining a measurement of the relative abundance of an isotope of the element of interest in the solid of interest by fragmenting the solid of interest using photons; obtaining a measurement of the relative abundance of an isotope of the element of interest in a reference solid possessing the same nominal crystal structure as the solid of interest; comparing the measurement of the relative abundance of an isotope of the element of interest in the solid of interest to the measurement of the relative abundance of an isotope of the element of interest in the reference solid; calculating the concentration of the element of interest in the solid of interest.

2. A method as defined in claim 1 wherein the step of obtaining a measurement of the relative abundance of an isotope of the element of interest in the solid of interest includes the step of fragmenting the solid of interest using photons.

3. A method as defined in claim 1 wherein the step of obtaining a measurement of the relative abundance of an isotope of the element of interest in the solid of interest includes the step of obtaining a measurement of the relative abundance of an isotope of the element in the solid of interest using a mass spectrometer.

4. A method as defined in claim 1 also comprising the steps: obtaining a measurement of the relative abundance of an isotope of a second element in the solid of interest; calculating the ratio of the measurement of the relative abundance of the isotope of the element of interest in the solid of interest to the measurement of the relative abundance of the isotope of the second element in the solid of interest; obtaining a measurement of the relative abundance of an isotope of the second element in the reference solid; calculating the ratio of the measurement of the relative abundance of the isotope of the element of interest in the reference solid to the measurement of the relative abundance of the isotope of the second element in the reference solid.

5. A method as defined in claim 4 also comprising the step of comparing the ratio of the measurement of the relative abundance of the isotope of the element of interest in the solid of interest to the measurement of the relative abundance of the isotope of the second element in the solid of interest to the ratio of the measurement of the relative abundance of the isotope of the element of interest in the reference solid to the measurement of the relative abundance of the isotope of the second element in the reference solid.

6. A method as defined in claim 5 also comprising the step of calculating the concentration of the element of interest in the solid of interest.

7. A method as defined in claim 6 wherein the step of calculating the concentration of the element of interest in the solid of interest also comprises the step of executing a computer software program comprising instructions for calculating the concentration of the element of interest in the solid of interest.

8. A method as defined in claim 6 also comprising the step of measuring the abundance of $^{4}He$ atomic nuclei in the solid of interest relative to the abundance of $^{238}U$ atomic nuclei in the solid of interest.

9. A method as defined in claim 6 also comprising the step of measuring the abundance of latent fission tracks in the solid of interest relative to the abundance of $^{238}U$ atomic nuclei in the solid of interest.

10. A method as defined in claim 6 also comprising the step of measuring the abundance of $^{206}Pb$ atomic nuclei in the solid of interest relative to the abundance of $^{238}U$ atomic nuclei in the solid of interest.

11. A method of determining the concentration of an element of interest in a mineral of interest comprising the steps of: obtaining a measurement of the relative abundance of an isotope of the element of interest in the mineral of interest by fragmenting the mineral of interest using photons; obtaining a measurement of the relative abundance of an isotope of the element of interest in a reference mineral of the same mineral species as the mineral of interest; comparing the measurement of the relative abundance of an isotope of the element of interest in the mineral of interest to the measurement of the relative abundance of an isotope of the element of interest in the reference mineral; calculating the concentration of the element of interest in the mineral of interest.

12. A method as defined in claim 11 wherein the step of obtaining a measurement of the relative abundance of an isotope of the element of interest in the mineral of interest includes the step of fragmenting the mineral of interest using photons.

13. A method as defined in claim 11 wherein the step of obtaining a measurement of the relative abundance of an isotope of the element of interest in the mineral of interest includes the step of obtaining a measurement of the relative abundance of an isotope of the element in the mineral of interest using a mass spectrometer.

14. A method as defined in claim 11 also comprising the steps: obtaining a measurement of the relative abundance of an isotope of a second element in the mineral of interest; calculating the ratio of the measurement of the relative abundance of the isotope of the element of interest in the mineral of interest to the measurement of the relative abundance of the isotope of the second element in the mineral of interest; obtaining a measurement of the relative abundance of an isotope of the second element in the reference mineral; calculating the ratio of the measurement of the relative abundance of the isotope of the element of interest in the reference mineral to the measurement of the relative abundance of the isotope of the second element in the reference mineral.

15. A method as defined in claim 14 also comprising the step of comparing the ratio of the measurement of the relative abundance of the isotope of the element of interest in the mineral of interest to the measurement of the relative abundance of the isotope of the second element in the mineral of interest to the ratio of the measurement of the relative abundance of the isotope of the element of interest in the reference mineral to the measurement of the relative abundance of the isotope of the second element in the reference mineral.

16. A method as defined in claim 15 also comprising the step of calculating the concentration of the element of interest in the mineral of interest.

17. A method as defined in claim 16 wherein the step of calculating the concentration of the element of interest in the mineral of interest also comprises the step of executing a computer software program comprising instructions for calculating the concentration of the element of interest in the mineral of interest.

18. A method as defined in claim 16 also comprising the step of measuring the abundance of $^{4}He$ atomic nuclei in the mineral of interest relative to the abundance of $^{238}U$ atomic nuclei in the mineral of interest.

19. A method as defined in claim 16 also comprising the step of measuring the abundance of latent fission tracks in the mineral of interest relative to the abundance of $^{238}U$ atomic nuclei in the mineral of interest.

20. A method as defined in claim 16 also comprising the step of measuring the abundance of $^{206}Pb$ atomic nuclei in the mineral of interest relative to the abundance of $^{238}U$ atomic nuclei in the mineral of interest.

* * * * *